(12) United States Patent
Boll et al.

(10) Patent No.: US 12,505,211 B2
(45) Date of Patent: Dec. 23, 2025

(54) METHOD FOR DETECTION OF MALWARE

(71) Applicant: inlyse GmbH, Karlsruhe (DE)

(72) Inventors: Christian Boll, Karlsruhe (DE); Julian Ziegler, Herxheim (DE)

(73) Assignee: inlyse GmbH, Karlsruhe (DE)

( * ) Notice: Subject to any disclaimer, the term of this patent is extended or adjusted under 35 U.S.C. 154(b) by 144 days.

(21) Appl. No.: 18/031,640

(22) PCT Filed: Oct. 30, 2020

(86) PCT No.: PCT/EP2020/080599
§ 371 (c)(1),
(2) Date: Apr. 13, 2023

(87) PCT Pub. No.: WO2022/089763
PCT Pub. Date: May 5, 2022

(65) Prior Publication Data
US 2023/0394144 A1    Dec. 7, 2023

(51) Int. Cl.
*G06F 21/56*    (2013.01)
*G06V 10/764*    (2022.01)

(52) U.S. Cl.
CPC .......... *G06F 21/562* (2013.01); *G06V 10/764* (2022.01); *G06F 2221/033* (2013.01)

(58) Field of Classification Search
CPC .. G06F 21/562; G06F 2221/033; G06F 21/56; G06V 10/764; G06V 10/50; G06V 10/82; G06N 3/045; G06N 3/08

(Continued)

(56) References Cited

U.S. PATENT DOCUMENTS 10,437,999 B1*  10/2019  Bhattacharyya ........ G06F 16/13
10,977,367 B1*   4/2021  Adler .................... G06F 21/568
(Continued)

FOREIGN PATENT DOCUMENTS

CN      110532771 A     12/2019
CN      108280348 B      6/2021

OTHER PUBLICATIONS

Kumar Ajit et al: "Machine learning based malware classification for Android applications using multimodal image representations", 2016 10th International Conference on Intelligent Systems and Control (ISCO), IEEE, pp. 1-6, Jan. 7, 2016 (Jan. 7, 2016).
(Continued)

*Primary Examiner* — Badri Narayanan Champakesan
*Assistant Examiner* — Badri Champkesan
(74) *Attorney, Agent, or Firm* — Volpe Koenig

(57) ABSTRACT

For improving the efficiency of malware detection, a method is proposed that can handle computer files (1) of varying types and sizes and at the same time maintain a high detection performance by classifying a number of different types (A, B, C, D, E) of images (4), each calculated or derived from a particular computer file under test (1) (CFUT), using artificial intelligence methods such as machine learning, in particular deep learning, for example as provided by neuronal networks (24) or supervised deep learning algorithms. The different image types (A, B, C, D, E) are generated using different image conversion techniques and a number of approaches are presented for computing images (4) of uniform size $S_i$ that contain relevant information for classifying the CFUT (1).

27 Claims, 9 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 11,556,644 | B1* | 1/2023 | Zeppenfeld | ............. G06F 16/14 |
| 2006/0282886 | A1* | 12/2006 | Gaug | .................. H04L 63/1408 |
| | | | | 726/5 |
| 2013/0117850 | A1* | 5/2013 | Britton | .................. G06F 21/567 |
| | | | | 726/23 |
| 2019/0311120 | A1* | 10/2019 | Jaenisch | ............... G06F 21/566 |
| 2020/0175164 | A1* | 6/2020 | Nataraj | .................. G06F 21/565 |
| 2020/0317458 | A1* | 10/2020 | Kanada | ..................... G06N 3/09 |
| 2021/0397877 | A1* | 12/2021 | Kacewicz | ............. G06F 40/143 |

OTHER PUBLICATIONS

Li Chen: "Deep Transfer Learning for Static Malware Classification", arxiv.org, Cornell University Library, 201 Olin Library Cornell University Ithaca, NY 14853, Abstract, Sections I-IV, Figure 1, 9, 10 Tables I, II, III, IV, 9 pages, Dec. 18, 2018 (Dec. 18, 2018).

* cited by examiner

METHOD FOR DETECTION OF MALWARE

CROSS-REFERENCE TO RELATED APPLICATIONS

This application is a 371 National Phase of PCT/EP2020/080599, filed Oct. 30, 2020, which is incorporated herein by reference as if fully set forth.

TECHNICAL FIELD

The invention relates to a method for detection of malware, such as a defective code or a computer virus. Such malware is typically contained in computer files, and these computer files may have constant or varying sizes.

The invention further concerns a computer system, a computer program and a computer-readable storage medium, such as a physical data carrier or a network resource, which are all related to the above method.

BACKGROUND

Malware is generally considered as a type of software or code that possesses malicious characteristics to cause damage to the user, a computer, or a network, for example. Malware can be differentiated into known malware (i.e. previously classified), potentially unwanted applications and unknown binaries.

in the state-of-the-art, there are two fundamental types of malware detection approaches: In static analysis, observable artifacts of software objects are analyzed, whereas in dynamic analysis, information is generated dynamically by executing software objects which are under scrutiny.

In static analysis, malware is thus detected without executing an application or monitoring the run time behavior of a particular code. A classic static analysis technique is signature matching, in which a match is to be found with malicious signatures (which constitute a kind of fingerprint of the malware). A large disadvantage of this approach is that, as signatures increase exponentially and are highly versatile, signature matching must keep up with current development of malware signatures to be effective. As around 360.000 new malware samples hit the global computer networks every single day, while around 70% of this malware exists only once and around 80% of this malware disappears after one hour, keeping up with this extremely fast development of signatures is becoming an increasingly unrealizable task.

The drawback of dynamic analysis on the other hand is that such techniques can be highly time-consuming and computationally intensive. Therefore, dynamic malware analysis systems are generally expensive to maintain and to operate.

Another important challenge is that computer files vary greatly in terms of size and structure. Maintaining a high security of malware detection for computer files of random size and structure, including computer files with integrated sub-files, is therefore mandatory.

Beginning in the early 1980s static signature & heuristics based antivirus (AV) systems dominated the market. In the 1990, first so-called sandboxing systems entered the market, in which malware was executed in a safe sandbox-environment to allow safe dynamic analysis. Around the year 2012, first machine-learning based AV-solutions were offered.

SUMMARY

Starting from this background, a central object of the invention is to achieve a high classification performance of static malware analysis and to outperform classic static analysis approaches. It is a further object of the invention to develop a malware detection approach that is highly adaptive to computer files of varying types and sizes and is also highly difficult to circumvent by malicious code architecture, in particular by obfuscation schemes.

In accordance with the present invention, a method is provided having one or more of the features disclosed herein, which solves the afore-mentioned problem. In particular the invention proposes a method as introduced at the beginning, which, in addition, is characterized in that a computer file under test, referred to in the following as CFUT, is processed by the following steps: the CFUT is converted into image data that comprise a multitude of different images; the image data are classified using a method of artificial intelligence, in particular a method of machine learning, in particular deep learning, to detect the malware. As a final step, the CFUT may be safely isolated in case malware is detected, to provide protection from the malware, for example by isolating affected attachments of an email that were detected as containing malware using the method.

Artificial intelligence may be understood here as producing a method that can sense, reason, act or adapt. Machine learning methods are based on algorithms whose performance improve as they are exposed to more and more data over time. Standard methods of machine learning employ for example neural networks, decision trees or other classification methods. Also deep learning is a subset of machine learning in which multi-layered neural networks (NN) learn from vast amounts of data.

For processing, the CFUT may be stored temporarily in a memory. The CFUT may also be extracted from data traffic, for example traffic from a network connection. Such data traffic can also result from remote connections, in particular internet connections. The term computer file may be understood here in a broad sense as comprising any sort of binary data that is summarized into a data block. Hence, the computer file under test (CFUT) 1 may be of any file format. For example, it may be a standard PDF-document or an executable file.

The images may be different in their visual appearance, i.e. in the underlying image data. For example, two color images of same type and identical image size S may be different in the distribution of a particular color; or two black-and-white images may be different in the distribution of black pixels.

It is obvious for those skilled in the art, that this method may be implemented by a computer, in particular all steps of the method (as described herein) may be computer-implemented.

Central to the invention is to transform digital data, such as computer files, potentially affected by malware to images that are then classified using methods of machine learning. Computer vision and related research fields have shown that robust and fast classification is possible based on images. The term classification may be understood here in that classification modules, for example in the form of a multi-layer neural network, may classify a particular image as belonging to a certain class of images corresponding to malware. Such classification can be based on training performed with training data in the form of image files derived from known malware.

In the above method, each of the multitude of different images may be classified independently from the other images. The method may thus evaluate the malignity of the CFUT, in particular with a digital result (YES/NO), based on an overall classification result of the multitude of different images. The result of this evaluation may be used to trigger further actions within a computer system possibly affected by the malware. The detected malware can be an intentionally designed defective code or simply an artefact affecting the normal operation or use of the CFUT.

Each of the different image files may thus be processed by a separate image classification module that is based on machine learning from training data. In addition, a classifier module may detect the malware by processing outputs of the image classification modules. Such outputs may be produced in the form of a scalar, e.g. a pre-classification score between 0 and 100, or as a multidimensional output vector.

The above method allows robust detection of malware by relying on an image classification, which considers relevant semantic characteristics, in particular of inner data components, of the CFUT. Importantly, the detection of the malware may be based on static analysis of the CFUT only.

The term "image" may be understood here, in particular, as a multidimensional (e.g. 1.5d, 2d, 3d, 4d, etc.) representation of digital binary data. Rasterization may be used to convert such image data into a grid of pixels that can be used for visualization purposes (allowing humans to view such images), although the method may be implemented in computer software without relying on any such visualization (visualization may be useful, however, for human-based optimization of the classification, for example by fine-tuning the classification). Moreover, the term "image" may be understood as describing any sort of data representing a multidimensional vector space. In the simplest form, an image may be represented by an array of continuous data, wherein each data point represents a pixel of the image, i.e. a certain point within the vector space. Each such pixel may thus be represented by a number of bits defining the brightness and/or color and/or spatial position of the pixel.

Such image data or images may thus be characterized in that these image data contain neighborhood information describing the spatial relation between different data points (pixels) within the image. Hence, the images used for classifying the malware may be characterized as data that allow calculation of spatial distances between data points (i.e. pixels) constituting a single image. Such distances may be understood as a measure of remoteness between those data points in the vector space represented by the image data.

The image may have any spatial support. However, calculations may be more efficient by using a spatial support that has rectangular or even quadratic faces. The pixels of an image may have any shape. However, preferably all pixels are of equal shape. Thus, preferably, an image is represented by a pixel matrix having $N_1 \times N_2 \times N_3 \times \ldots \times N_d$ entries, with d the dimension of the matrix. $N_1$ may be any natural number, typically multiples of 2. For example, a 2d-image might be represented by 256×256 pixels. It is clear, that any image needs to be supported by associated image data, typically stored in a convenient image file format.

According to the invention, there exist further advantageous embodiments solving the aforementioned problems, which are described in the claims and in the following description.

For example, it is suggested to use separate and specific image classification modules, for each of the different image types used. Hence at least two of the different images may be classified each by a separate image classification module. The outputs of the image classification modules may then be evaluated by an additional classifier module to detect the malware. To enhance the performance of the malware detection, the image classification modules and/or the classifier module can be trained using training images, which can be done prior to the classification of the image data.

It is further suggested to employ uniform image sizes, i.e. to use a particular image size $S_i$ consistently (and independently of the CFUT currently investigated) for a particular type of image (the image size S will thus be static/constant), since this greatly benefits machine learning methods. Hence, the CFUT may be converted such that for at least one, preferably for all, of the different images, a respective uniform image size $S_i$ is maintained independent of the size X of the CFUT. A conversion that maintains a particular image size $S_i$ independent of the CFUT to be converted can be achieved by using a loss-less conversion, in which all data of the CFUT are considered, or by converting only part of the data contained in the CFUT and neglecting the remainder of the CFUT, as will be explained in greater detail below. In summary, following such approaches a uniform image size $S_i$ of a particular type of image may be maintained without cropping a particular image to its desired uniform image size $S_i$.

Image cropping has the fundamental disadvantage that no integral representation of the CFUT is generated; for example, a cropped image may only represent parts of the body or the footer of a CFUT. This poses the risk that a cropped image may be classified as resulting from a benign CFUT although the CFUT contains malware, which may be nested exactly in those parts of the image that have been cropped away. In addition, images that may be classified individually as benign may be classified together as malign. Image cropping thus poses fundamental risks, if not combined with other sophisticated methods.

Importantly, the multitude of different images may comprise several different image types. Each image type may be characterized by a particular image size $S_i$. Therefore, the respective image sizes $S_1$, $S_2$, $S_3$, etc. of some of the different images may be different, while some of the images, in particular when being of the same image type, may have the same image size. However, various CFUT of varying sizes $X_i$ may be converted into a uniform image size $S_i$ with respect to a particular image type used among the different images, for example for a particular type of gray-scale image. Moreover, an image classification module used to classify one of the different image types may be trained using training computer files of different sizes $X_i$. In this case, the training computer files may be converted into training images of the uniform image size $S_i$ of the image type classified by the module and used as inputs to that image classification module for training.

Within the scope of this invention the terms "several" and "some" mean at least two, preferably at least three. Also the terms "repeatedly" and "series" refers to at least two elements.

In conclusion, there may be different uniform image sizes $S_i$, each used for a respective one of the different image types. In other words, the conversion of the CFUT may be such that a respective uniform image size $S_i$ is maintained for each one of the different image types, independent of the (current) size X of the CFUT.

In detail the method may include, that a uniform image size S is specified as a parameter being independent of the size of the CFUT. The CFUT may thus be converted such that one or several of the different images have the specified uniform image size S. An image classification module used to classify such images of size S may be trained using training computer files of different sizes; however, the training files may be converted into training images of the uniform image size S and used as inputs to the image classification module. Of course, there may be also different uniform image sizes $S_i$, each used for a respective one of the different images, in particular for a respective image type. In other words, the conversion(s) of the CFUT may be such that a respective uniform image size $S_i$ may be maintained for each one of the different images, independent of the size S of the CFUT currently investigated.

Using different image types among the multitude of different images may have the effect that the different images differ in their respective image size $S_i$ and/or in the respective underlying conversion algorithm used for calculating the particular image type and/or in the respective pixel type used for the particular image type. Such different pixel types may be one-dimensional gray-scale pixels or multidimensional color pixels, for example.

The advantage of this approach is that each of the different image types employed can provide a different semantic representation of the CFUT. For example, the semantic representation provided by different image types can differ in terms of information on a structure and/or on a composition and/or on a spatial distribution and/or on a density and/or on statistics of inner data components of the CFUT, respectively. Such inner data components may be data defined by the user/editor of the CFUT (which may be referred to as the "bacon") or data representing structural information (which may be referred to as the "skeleton").

The information provided by or derived from single ones of the images may thus include latent space representations as well as non-latent space representations, and both of these types may be used in the classification of the images. A latent space representation may be understood here as providing information about the CFUT that is not plainly observable from the raw data of the CFUT. Rather, latent space representations must be typically derived from the raw data of the CFUT, for example by processing an image obtained from the CFUT with a neural network. As latent space representations may represent important (image) features of the original image, they can contain all relevant information needed to classify the original image and thereby the CFUT.

By using different representations of the CFUT in the form of varying image types each providing a specific part of information relevant for the detection of malware, the success rate of malware detection can be greatly improved. For example, even when the file size X of the CFUT varies greatly, e.g. due to a varying size of user specific information (bacon) contained in the CFUT, the approach of using multiple different image representations of the CFUT (or parts of the CFUT) will safeguard that relevant information on the structure or randomness or entropy of the data contained in the CFUT will still be fed into the classification with sufficient detail. This is because single ones of the different images can be tailored to represent different semantic qualities/aspects/characteristics of the CFUT.

As already mentioned, the method can be based purely on static analysis. Hence, the image data may be classified purely by static analysis, in particular without dynamic interaction with the CFUT and/or without activating the malware. This approach has the benefit that no execution of the CFUT is required, which would be potentially harmful, even in a sand-box environment.

Another important suggestion for improving the robustness of the detection and also for increasing the difficulty in bypassing such detection by the malware itself is to calculate images from randomly selected data subsets of the CFUT. For example, at least one of the different images may be an image calculated from a subset of data of the CFUT. In this case, the image size $A_i$ of that particular image can be maintained independent of a size X of the CFUT, in particular by neglecting some of the data of the CFUT.

In this case, it is highly preferable if the subset is selected randomly from the CFUT and/or independently of a size X of the CFUT. For example, the subset may be selected by employing a random number generator. In this case, it will be impossible to predict, which data points of the CFUT will be considered for the calculation of the image and what the image will look like.

Nevertheless, as the image is calculated from data of the CFUT, the image is a characteristic representation of the CFUT. In particular, malicious CFUT will produce certain characteristics in the image, even when the subset of data is randomly chosen, and those characteristics can be detected using available methods of machine learning. The random selection of the data may follow a predetermined probability distribution such as an even distribution or a distribution centered at different locations within the CFUT or within the image space defined by the particular image.

In order to preserve some locality of the data randomly extracted from the CFUT, it is of advantage if the subset of data randomly selected from the CFUT consists of subsubsets of data. These subsubsets may each represent a particular local portion of the CFUT, in particular within a particular data segment of the CFUT. For example, a subsubset may consist of three bytes which follow consecutively on each other in the CFUT. In other words, the data contained in one of these subsubsets may be locally near each other within the CFUT, in particular such that these data form a string of data (e.g. a string of three bytes).

To provide a representative sampling of data contained in the CFUT, the CFUT may be divided into data clusters. In other words, the subset may be selected by dividing the CFUT into data clusters, preferably of uniform cluster size, and by randomly selecting data from within each of the clusters to form the subset. In this case, it is preferably when multiple data points from within one particular of said clusters are used to calculate a particular, preferably multi-dimensional, pixel of said image of uniform image size $S_i$. The clusters may be defined based on the size of the image and the CFUT, for example based on a ratio r of $r=X_i/S_i$. That is the data clusters may show a uniform cluster size. Alternatively, the cluster size may be chosen randomly and/or variable cluster sizes may be used, to further enhance the randomness of the selection of the subset of data used for the calculation of the image. By using multidimensional pixels, the meaningfulness of the image can be increased as it represents more information than a simple gray image.

Additionally or alternatively, it is of great advantage for efficient malware detection if an image space defined by said image is filled up with said pixels by arranging the pixels in the image space using a space filling curve, preferably using a Hilbert curve. By using a space filling curve, the image space can be filled up completely, even when the ratio $r=X_i/S_i$ varies largely.

A major advantage of using a space filling curve is that the locality of the information contained in the CFUT can be better preserved in the image. This means that pixels which are close to each other in the image are computed from data which are close to each other within the CFUT. Such an approach of maintaining locality is specifically adapted to convolutional neural networks, since these networks typically generalize image data by using 2D-rasterization (e.g. by generalizing a N×N pixels area into a single Max-/Min-/average value).

For increasing the intensity and depth of scrutiny of the CFUT, the process of randomly selecting data from the CFUT for calculation of a particular image may be repeated. That is, the same CFUT may be repeatedly converted into an image of uniform image size $S_i$, each time calculating a respective image from a randomly selected subset of data of the CFUT. Using this approach, a (first) series of images all calculated from varying data subsets of the CFUT can be obtained. The malware may then be detected by classifying, either sequentially or in parallel, said series of images.

Preferably, the conversion can be repeated until all data contained in the CFUT have been used at least once for calculating said series of images, most preferably at least to some pre-defined confidence level (e.g. after a number N of repetitions, there will be a 90% confidence that all data of the CFUT has been converted into an image at least once). Although the single images of the first image series may be calculated using the same algorithm, they will look different as each of said images will be a representation of a different subset of data of the CFUT. By repeating the conversion, more and more of the data of the CFUT can be represented as an image, until all data contained in the CFUT are represented by at least one image of the series of images. In other words, the number of images to be produced may be chosen depending on the file size X of the CFUT; the larger X, the more images will be necessary.

Lossless mapping of data, in particular without any zero padding, may be used for generating images from the CFUT. To this aim, the CFUT may be converted into one of the different images by mapping, in particular reordering, preferably all, data contained in the CFUT to that particular image. This means that all pixels of at least one of the different images may be calculated from data of the CFUT, in particular without relying on zero padding.

Another approach for generating a particular type of image type is to calculate image pixels from sequence of data blocks, in particular from byte sequences. If the resulting image size exceeds a desired uniform image size $S_i$, some of said pixels may be deleted until the number of pixels is adequate for filling up the image size $S_i$. For example, all pixels of at least one of the different images may be calculated from a respective sequence of, preferably neighboring, data blocks (in particular bytes) of the CFUT. In this case, a desired uniform image size $S_i$ can be maintained by deleting pixels iteratively and thus using only a subset of the calculated pixels in the final image.

Another way of maintaining a uniform image size, which may be used alternatively or additionally, is the use of so-called space-filling curves, which was mentioned above. For example, an image space defined by at least one of the images may be filled up completely with pixels calculated from data of the CFUT using a space filling curve, most preferably a Hilbert curve. In this case, each pixel of that particular image can represent data contained in the CFUT. Moreover, the CFUT can be converted into one of the different images by mapping, in particular reordering, a sequence of data blocks of the CFUT using a space filling curve, preferably using a Hilbert curve.

One major advantage of using a space filling curve for converting the CFUT into image data is that—different from reshaping and resizing of images obtained by a simple direct transfer of data from the CFUT—the image data can be obtained largely or completely free of distortions, such that characteristics of the CFUT, which are relevant for the image classification, can be preserved.

Another suitable type of image that may be used for enhancing the detection performance are entropy images. Entropy may be understood here (as used in classical information theory, e.g. Shannon entropy) as a measure of average information content, with a small entropy indicating a high order and hence low information content. Hence it is suggested that at least one of the different images is generated from the CFUT by calculating entropies of data blocks of the CFUT. In this case, pixel values of the resulting image may be given by ratios of the calculated entropies divided by the total entropy of the CFUT, i.e. as relative local entropies; for example, the pixel values may be normalized to an interval ranging from 0 to 1, to indicate the local relative entropy of a particular data block within the CFUT.

The resulting entropy images can thus visualize local entropy distributions within the CFUT. This is particularly helpful for detecting obfuscated code in the CFUT. Code obfuscation mechanisms are frequently used by developers of malware to bypass malware detection technologies, thus making it hard for an AV-software to detect such malware. However, use of a large variety of code obfuscation mechanisms, for example Packers or Cryptors, typically produces high entropy. The use of entropy images therefore greatly improves the detection of malware, as such obfuscation can be detected as local hotspots of the entropy.

In fact, any property of the CFUT that can be extracted as a numerical value may be used to convert the CFUT into an image to be classified. For example, an appropriate metric may be defined and applied to the CFUT to extract such values and compute an image from these values.

In addition, latent space representations, in particular described as a vector in a high-dimensional vector space, may be extracted from images computed from the CFUT, and such data may be evaluated to detect malware. For example, the CFUT may be represented as a color image by grouping/transforming successive bits or bytes into pixels and by giving the pixels a certain order. Next, statistical properties or other data features may be extracted from the color image, an these data may be analyzed in a vector space as a latent space representation of the image.

For example, convolutions may be used to generate more and more generalized representations of an original image obtained from the CFUT, until a latent space representation of the original image is achieved, which can then be used as input for a classifier module, such as a neural network or a boosted tree.

To improve the detection rate, overlapping or same portions of the CFUT may be converted into different images, in particular into images of different image type.

For robust detection of malware, it is also important to maintain locality information within the images obtained from the CFUT. Therefore, it is suggested to map different local data segments of the CFUT to corresponding image segments. For this purpose, at least one of the different images of size A may be obtained by segmenting an image space of that particular image into a multitude of image segments, by segmenting the CFUT into data segments, in particular of successive data blocks, and by mapping different ones of the data segments onto different ones of the image segments. For easy composition of the resulting image, it is of particular advantage if the image segments have rectangular, preferably quadratic, faces. This also facilitates the use of space filling curves, when filling up or defining the image segments.

To enhance the locality of data representation in an image, it is suggested for at least one of the different images, that the pixels of that image are calculated from data blocks of the CFUT and that the pixels are re-allocated in blocks filling respective image segments of the image. In this case, it can be achieved in particular, that that neighboring pixels within a particular image segment are calculated from (and thus visualize) data blocks which are contained within a specific local data segment of the CFUT. Following this approach, it can therefore be achieved that the particular image segment and the corresponding data segment are spatially correlated. Therefore, the locality of information of the CFUT is preserved at least within the image segments of the resulting image.

The explained re-allocation of data can be tailored in particular to the needs of convolutions employed in the classification of the images. This may be the case, if a convolutional neural network (CNN) or a convolutional XGBoost (ConvXGB) is used as an image classification module, for example. For this purpose, at least one of the different images may be classified by an image classification module, in particular by a convolutional classifier, such as a convolutional neural network, that employs a convolution window of size C for processing said image and said image may therefore be divided into image segments which match the size C of the convolution window. In this case, it is highly preferably if the image segments are filled up with pixels calculated from data contained in corresponding local data segments of the CFUT. This way, the classifier can derive a meaningful latent space representation of the CFUT from a convolution of the image (e.g. by using an appropriate Kernel or filter). In this case, the latent space representation derived from a particular image segment will be correlated to the respective data segment of the CFUT. The size C of the convolution window may be different among different ones of the image classification modules, depending on the image format to be processed.

In particular large computer files may actually consist of several sub-files. In such a case, it is suggested to split up the CFUT into sub-files and to perform image conversion on each of the sub-files. In case a sub-file is detected as containing malware, the original CFUT may be classified as being malign. Hence, the CFUT may be first split up into sub-files, and each of the sub-files may be converted into a different image. Another approach that may be used additionally or alternatively is to segment at least one of the different images into a multitude of sub-images. In this case, data contained in one of the sub-files of the CFUT may be mapped to a respective one of the sub-images.

These steps can also be iteratively applied to further sub-sub-files contained in the sub-files of the CFUT, in particular to generate further sub-sub-images, as part of the sub-images.

For improving the meaningfulness and information content of particular images used in the detection of the malware, the CFUT may be split up into its skeleton and bacon (c.f. above) prior to image conversion. Thereby, important structural information can be preserved, in particular when processing large CFUT. Hence, the CFUT may be first divided into a skeleton-file containing structural information, in particular about the type of CFUT, and a bacon-file containing user-specific information, characterizing the particular CFUT currently under investigation. In this case, the skeleton-file and/or the bacon-file may be each converted into one of the different images used for the detection of malware. This may be done, preferably, by applying a byte-conversion (which will be detailed below) to the skeleton-file and/or the bacon-file, respectively. Afterwards, the corresponding image files obtained from the skeleton-file and the bacon-file may be separately classified.

A further concept for maintaining uniform image sizes of the different types of images used in the method is downsizing, either of portions of the CFUT and/or of sequence of data strings within the CFUT. It is therefore suggested that prior to or during the conversion of the CFUT into one of the different images at least a portion of the CFUT (which may be in particular the complete CFUT) is downsized to a reduced set of data. In particular, and different from (e.g. randomly) selecting only a subset of data from within a portion of the CFUT, all data contained in the portion of the CFUT may contribute to the reduced set of data. Hence, the reduced set of data may represent or may be derived from all of the data contained in said portion.

Following this approach, the portion of the CFUT may be further segmented into a sequence of data strings and each data string may be downsized to a smaller data block. This may be done, in particular, such that all data of a particular data string contribute to the corresponding smaller data block.

It is also suggested to use multidimensional pixels for improving the information content of single images. In detail, pixels of at least one of the different images may be given by n-dimensional vectors, preferably with n=1 or n=3. For example, for n=1 the image may be a gray-scale image. For n=3 the image may be a colored image such as a RGB-image. Additionally or alternatively, pixels of at least one of the different images may have values that result from values of several, preferably successive, bits or bytes of the CFUT, in particular such that the pixels are given by n-dimensional vectors. In such cases, it is preferable if the respective n components of said vectors result from n neighboring data blocks, in particular n neighboring bytes, of the CFUT.

According to another possible embodiment of the method, compound images, composed from images already calculated from the CFUT, may be used to further enhance the effectiveness of the malware detection. For this purpose, at least two of the different images may be combined to a compound image. In other words, the image data obtained from the CFUT may comprise such a compound image. Preferably, the compound image has the same dimension (e.g. a 2D-image) as the at least two different images. Suitable dimensions for a compound image are d=2, thereby forming 2d-images, or d=3, thereby forming 3d-image volumes.

According to a particularly advantageous embodiment, a specific compound image may be designed that reveals the anatomy of the CFUT. Hence, at least one of the different images may be a compound image resulting from combining an image of a first image type calculated from a randomly chosen subset of data of the CFUT, and another image of a second image type visualizing local entropies of the CFUT. Most preferably, the compound image may further comprise a skeleton-image and a bacon-image, preferably each of a third or fourth image type, calculated from a skeleton-file and a bacon-file derived from the CFUT, respectively, as was explained previously.

The efficiency of malware detection can be further improved by evaluating characteristic data features of the CFUT, such as statistical data, in particular prior to the image classification. Therefore, a number of characteristic data features may be extracted from the CFUT directly, in particular without converting the CFUT into image data. These data features may then be fed into a separate data classification module, whose output is considered in the detection of the malware. In particular, a classifier module may consider the output of the data classification module and results of image classification modules, which are used for classifying the different images, in order to detect the malware. The data classification module may be based on a method of machine learning, similar to the image classification modules.

A somewhat different approach, which may be used alternatively or additionally, is to generate matrix images from different data features, such as statistical data and metadata, of the CFUT. To achieve this, a number of N of such data features may be extracted as N numerical values from the CFUT, and converted into a matrix image. The matrix image may be any kind of image, preferably a 2d or 3d image. Most preferably, the image data, which are classified using a method of machine learning, comprise the matrix image. The malware may then be detected based at least in part on a classification result of said matrix image. In this approach, the N values may each be normalized prior to the conversion. This way, each of the normalized values can be represented as a pixel in the matrix image. In particular if the number N is smaller than the number of available pixels of the matrix image (which may advantageously have a uniform image size $S_i$), the matrix image may be completed using zero padding, i.e. by filling up the remainder of the image with pixels having the value zero.

As mentioned at the beginning, the classification of the image data can be done using state-of-the-art methods of artificial intelligence such as machine learning. Particularly suited for the method presented herein are neural networks, since they are particularly effective in classifying multidimensional data. Accordingly, the image data may be classified using at least one neural network (NN), preferably a convolutional neural network (CNN), and/or at least one decision tree (DT). In other words, the particular method of artificial intelligence used for classifying a particular image type, which may be implemented by one of said image classification modules, can be designed for operating on arrays of continuous data and/or on data arranged in multi-dimensional image file formats, such as RGB color images. Hence, the image classification modules may be implemented as neural networks and/or the classifier module mentioned before may be implemented as a decision tree.

Finally, the method may be developed further in that at least two different latent space representations, in particular obtained from pre-processing at least two of the different images, may be classified to produce a pre-classification result that is evaluated to detect the malware. Such pre-processing may comprise convolutions of the image and/or extraction of features from the image.

For example, a separate latent space classification module may be used to classify at least two different latent space representations of at least one of the different images to detect the malware. Such representations can describe characteristics of an image relevant for malware detection and may be obtained, for example, from various hidden layers of a neural network (NN) that processes one of the images obtained from the CFUT, and in particular also from several hidden layers of different NN.

For solving the afore-mentioned problem, the invention further suggests a computer system, a computer program and a computer-readable storage medium: To execute the method successfully, the computer system can comprise means for carrying out the single steps of a method as described before or as defined by one of the claims directed towards a method. Likewise, said computer program may comprise instructions which, when executed by a computer, in particular by the computer system just explained, cause the computer/the system to carry out a method as described before or as defined by one of the claims directed towards a method. In analogy, the computer-readable storage medium may comprise such instructions for the same purpose.

Preferred embodiments of the present invention shall now be described in more detail, although the present invention is not limited to these embodiments: for those skilled in the art it is obvious that further embodiments of the present invention may be obtained by combining features of one or more of the patent claims with each other and/or with one or more features of an embodiment described or illustrated herein. In particular, myriad combinations of the different image conversions and resulting image types described herein may be advantageously used for detecting malware within a CFUT.

BRIEF DESCRIPTION OF THE DRAWINGS

With reference to the accompanying drawings, where features with corresponding technical function are referenced with same numerals even when these features differ in shape or design

DETAILED DESCRIPTION

Figure 1:
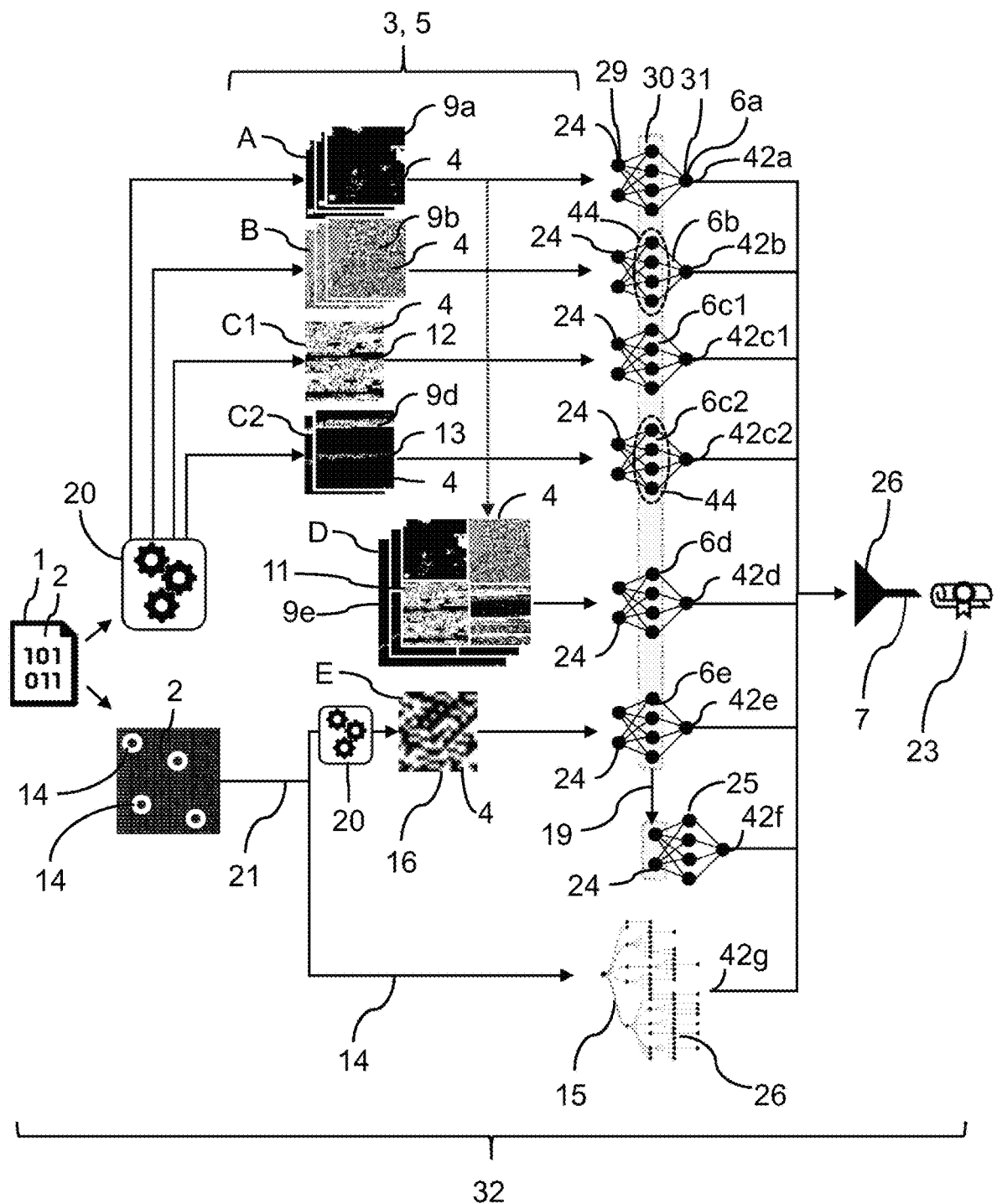
FIG. 1 is a schematic flow diagram illustrating single steps of a method for detection of malware according to the invention

FIG. 1 presents a possible design of a classification engine 32, implemented by software on a standard computer system, that executes a method for malware detection according to the invention. As illustrated, a computer file under test (CFUT) 1, for example a standard PDF-document temporarily stored in a memory of the computer system, is first converted into image data 3 using a conversion engine 20. The image data 3 comprise a multitude 5 of different images 4, namely a first series 9a of different images 4 of a first image type A, a second series 9b of different images 4 of a second image type B, further images 4 of a third image type C, several compound images 11 of a fourth image type E, which are each composed of one image 4 of type A, one image 4 of type B and two images 4 of type C (cf. FIG. 13), and finally yet another image 4 of a fifth image Type F in the form of a matrix image 16. All of these different images 4 have been calculated from data contained in the CFUT 1.

For each image type (A, B, C, D, E), the engine 32 of FIG. 1 offers a separate image classification module 6 (6a . . . 6e) in the form of a respective neural network 24 that has been trained with training images up-front to identify malign content in the respective images 4. In other words, the classification modules 6 classify the image data 3 using a method of machine learning, respectively.

Machine-learning algorithms, in particular neural networks, typically require a constant size of the input vector. Therefore, each of the image classification modules 6 is designed for a particular image size $S_i$ that is maintained in the conversion of the CFUT 1 into a particular image type A/B/C1/C2/D/E.

To detect any malware 2 contained in the CFUT 1, the outputs of the classification modules 6 are evaluated by a classifier module 7 in the form of a decision tree 26 that delivers a final classification score 23 between 0 and 100, expressing the probability of the CFUT being malign (e.g. 0=benign, 100=malign). Depending on this final classification score 23, the computer system executing the method may take further steps to safely isolate the CFUT, for example if the score 23 expresses a probability of the presence of malware 2 in the CFUT 1 above a certain threshold.

Likewise, each of the neural networks 24 employed delivers a pre-classification score 42 in the form of a numerical score value between 0 and 100. Alternatively, classification modules can also be used which deliver multidimensional output vectors representing a more complex classification result.

As can be seen in FIG. 1 a first conversion engine 20 converts the CFUT 1 into images 4 of the three different image types A, B, C. This conversion is done in such a way that no matter what the file size of the CFUT 1, a uniform image size $S_i$ is maintained for each of the images 4 of a particular image type, for example an image Size 51 is maintained for the images 4 of type A of the first series 9a. Therefore, none of these images 4 needs to be cropped, such that all pixels contained in the particular image 4 are considered by the respective classification module 6.

It is also possible to use sub-types of images 4, for example types C1 and C2, which are skeleton images 12 and bacon images 13 of image type C, respectively, but which differ in their respective uniform image sizes $S_3$ and $S_4$. This is possible by using different image classification modules 6c1 and 6c2, which are specifically designed for an input of image size $S_3$ or $S_4$, respectively.

Illustrated in FIG. 1 is also that a number of characteristic data features 14 are extracted from the raw CFUT, parallel to the image conversion performed by the conversion engine 20 for image types A, B and C. These features are fed directly into a data classification module 15 in the form of a decision tree 26 that delivers another pre-classification score 42g.

In addition, the data features 14 are converted by a second image conversion engine 20 into a matrix image 16 of image type E, that is classified by a respective image classification module 6e. The module 6e also delivers a pre-classification score 42e.

The engine 32 of FIG. 1 comprises yet another neural network 24 that implements a latent space classification module 25. This module 25 evaluates information processed by the image classification modules 6a, 6b, 6c1, 6c2, 6d and 6e; in particular, the module 25 evaluates latent space representations 44 (cf. FIG. 1) of the images 4 obtained in hidden layers 30 of the neural networks 24 used as image classification modules 6. In detail, the latent space representations 44 are obtained from the last hidden layer 30 before the output layer 31 of the respective neural network 24, which delivers a minimum multi-dimensional representation of the respective image 4, that is not accessible form the CFUT 1 directly. By collecting all of these high level representations and evaluating them in the latent space classification module 25, a highly robust detection of malware 2 can be achieved.

The consideration of such multi-dimensional and high level information obtained from pre-processing at least one of the different images 4 further improves the efficiency of malware detection. This may be done in particular by classifying such information against each other within a single deep learning based classification model, e.g. implemented by the module 25. Finally, the module 25 then delivers yet another numerical pre-classification score 42f.

Visible in FIG. 1 is also that the generated compound images 11, which are composed of one image 4 of type A, one image 4 of type B, and one skeleton-image 12 and one bacon-image 13 and, each of Type C, are classified by a separate image classification module 6d that delivers a pre-classification score 42d.

As is visible in FIG. 1, all pre-classification scores 42 are fed into the classifier module 7, which determines the final classification score 23 on the basis of the eight individual pre-classification scores 42a-42g, which are obtained by processing images 4 calculated from the original CFUT 1 or by processing further data derived from the CFUT 1 (as in the case of modules 15 and 6e, which process data features 14 and latent space representations 44 processed by the modules 6a-6e, respectively).

The method for detection of malware may thus be implemented by a classification engine 32 comprising
 a first layer of classification supported by tree-based and/or supervised machine learning algorithms that are fed with data features, in particular statistical data and/or metadata, extracted from the CFUT 1;
 a second layer of classification based on detection of specific image features, in particular supported by supervised deep learning algorithms; and
 a third layer of classification that is fed with classification results from the first and second layer.

Figure 2:
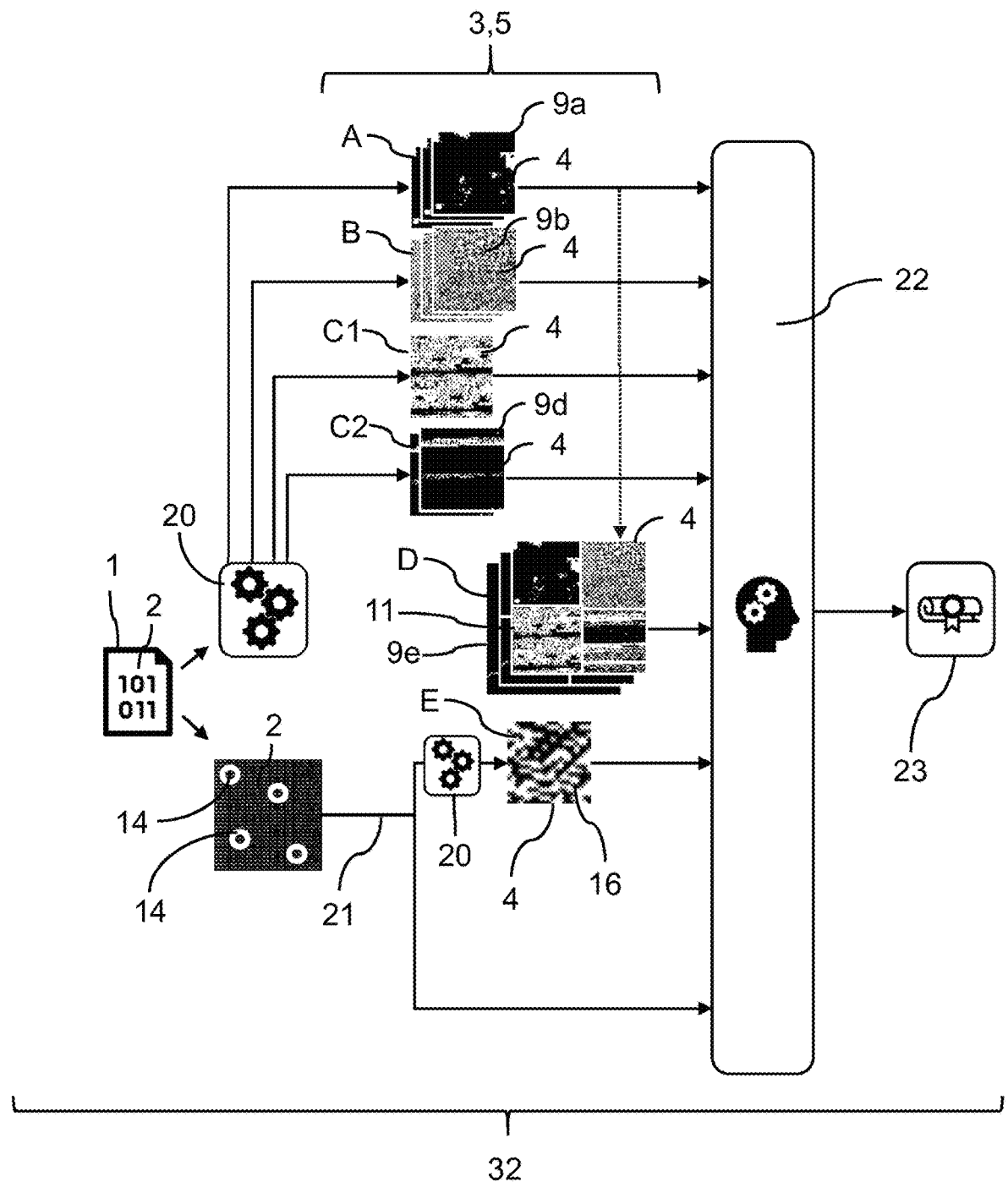
FIG. 2 is a schematic of another possible implementation of a classification engine implementing a method according to the invention.

FIG. 2 shows another possible implementation of a method according to the invention. The engine 32 of FIG. 2 executing the method features an artificial intelligence stack 22 that combines the functionality delivered by the modules 6, 7, 15, and 25 of FIG. 1, and delivers the final classification score 23.

The engine 32 illustrated in FIG. 2 extracts a certain number of statistical data and metadata features 14 from the raw CFUT 1 (e.g. a total of 418 different features in case of a PDF-file, but a different number in case of other file formats) to gather quantitative characteristics that are specific for the particular CFUT 1, for example the presence and amount of already known suspicious strings of characters, obfuscated, or encrypted data. Even though the method is relying on static analysis of the CFUT 1, statistical and metadata features are designed to not only quantify the internal composition of the CFUT 1 but also to extract indicators of malicious behavior and capabilities that are historically explored but normally only detected in dynamic analysis and interaction.

Once the statistical and metadata features are extracted, these quantitative data can be converted into yet a further matrix image 16 that characterizes the CFUT 1. To obtain the matrix image 16, each feature value extracted from the CFUT is first normalized, for example into a range of integers from 0 to 255, such that the normalized value can be represented by a pixel of the image 16. After normalization, the vector of length 418 is reshaped into a 2d-array of dimension 21×21. Next, a padding of zeros is applied to the difference between the 418 normalized values contained in the vector and the total of 21×21=441 pixels of the image. The resulting image 16 can provide a visual distinction between benign and malign CFUT 1.

It is to be noted here that all features explained so far with respect to FIGS. 1 and 2 are optional features that may or may not be implemented in a method according to the invention, at least within the scope of claim 1. That is, in the simplest case, a classification engine 32 executing the method may comprise a conversion engine 20 for converting the CFUT 1 into image data 3 comprising a multitude of different images 4, for example the stack 9a of three different images of type A, and at least on image classification module 6 for classifying the image data 3 based on a method of machine learning, which delivers a classification result indicative of the presence of malware 2 in the CFUT 1. All other features of the method/said engine 32 may be considered optional.

Figure 3:
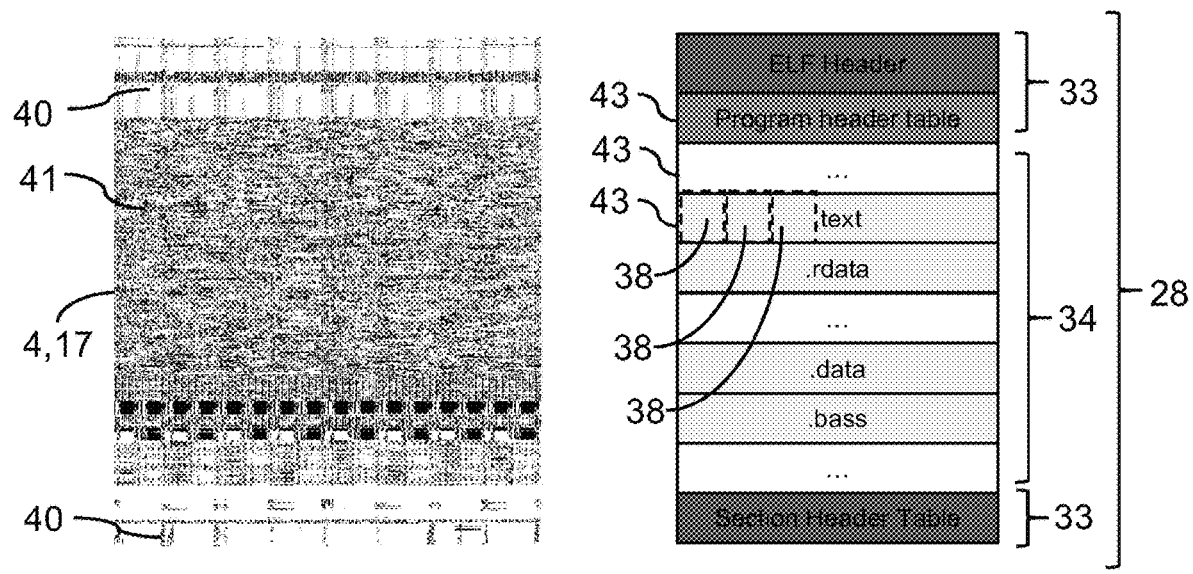
FIG. 3 illustrates details of the file-to-image-conversion approach used.

As illustrated in FIG. 3 any binary code present in a computer file can be plotted, for example as a grey-scale image 4, 17. Textural and structural similarities among malware from a particular malware family can then be identified in such an image 4 using image analysis techniques, in particular based on machine learning. The data-to-image-conversion used in the method can thus rely on so-called pixel conversion. Pixel conversion can be understood here as reading a byte of the CFUT and transferring it into a value between 0 and 255, which directly corresponds to a pixel intensity (in grey value). In other words, pixel conversion can convert a binary consisting of a string of bytes into a 1-dimensional stream of 1-dimensional pixels of varying intensity/grey-scale, for example by using the binary bit-by-bit encoding matrix 27 shown in FIG. 3. The resulting stream of pixels can then be reshaped into a multi-dimensional object, in the simplest case, into a 2d-grey-scale image with M×N pixels, which can be stored as an image file. Such an image 4 can thus represent a maximum of M×N bytes.

Figure 8:
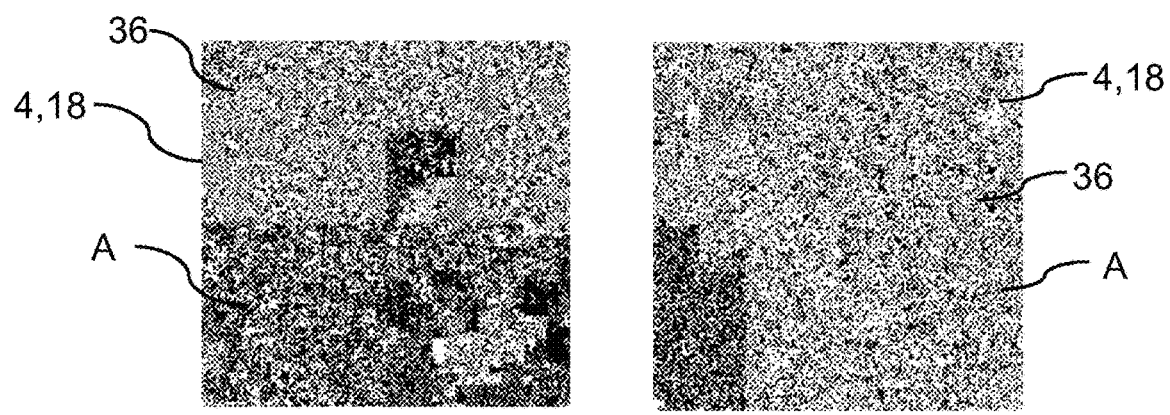
FIG. 8 shows two examples of images a first image type A obtained from benign (left) and malicious (right) PDF documents.

Alternatively, byte-strings of the CFUT 1 may also be converted into multidimensional pixels 36, for example into RGB-pixels; this type of pixel conversion is used for the generation of the images 4 of type A (cf. FIG. 8).

As visible in FIG. 3, the structure 28 of the original computer file illustrated on the right, can be recognized in the image 4 shown on the left; in particular skeleton portions 40 and bacon portions 41 can be recognized in the image 4, which correspond to the skeleton 43 and bacon 44 of the computer file illustrated on the right.

Figure 4:
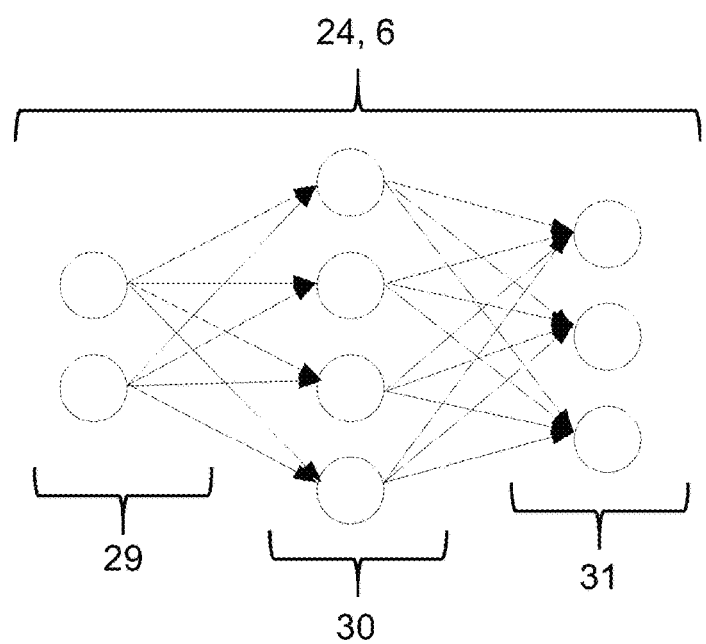
FIG. 4 illustrates a neural network, which may be used as a classifier

A convenient and efficient way of classification is to use neural networks (NN) 24 as the one illustrated in FIG. 4 that can be employed as a classifier. For this purpose, latent space representations 44 can be generated by convolutions of an image 4 and then fed as input to a NN 24 acting as a classifier. As shown, such networks 24 may have an input layer 29, one or several hidden layers 30, and an output layer 31, which can deliver a multidimensional or 1-dimensional output vector. Such a vector can represent a certain classification result of an image 4 obtained from the original CFUT 1. Importantly, such a network 24 requires an input vector of defined size, that does not change.

Figure 5:
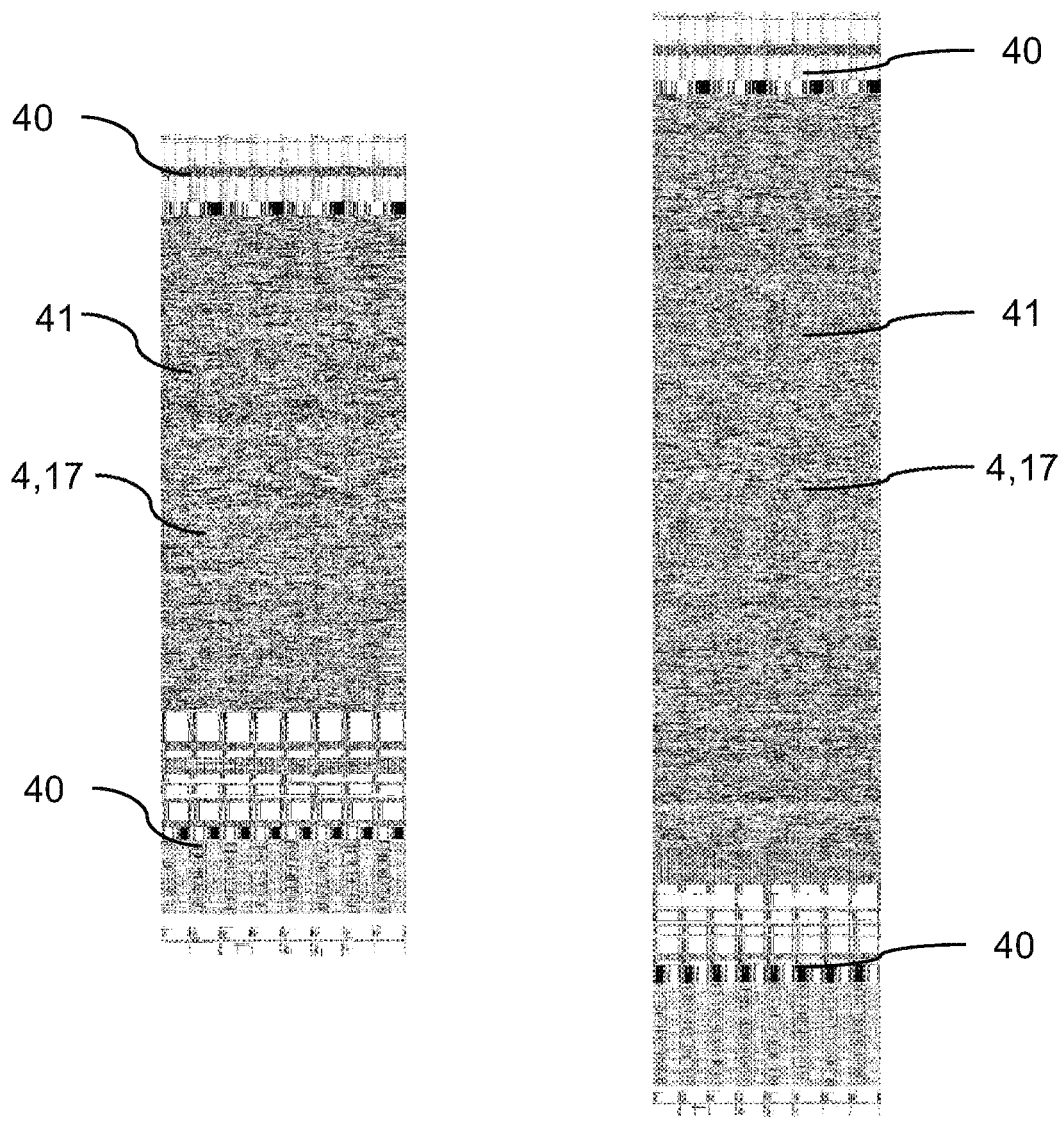
FIG. 5 illustrates examples of gray-scale images as they are obtained by direct bit-by-bit encoding of computer files of varying sizes

Purely for illustration purposes, FIG. 5 shows the result of a grey-scale image conversion of two separate computer files that differ in file size. As is visible, the resulting image size (e.g. in terms of columns×lines or number of pixels) will be different. Such images 4 of varying size cannot be efficiently classified by a single classification module/a single neural network, or only with severe drawbacks.

Figure 6:
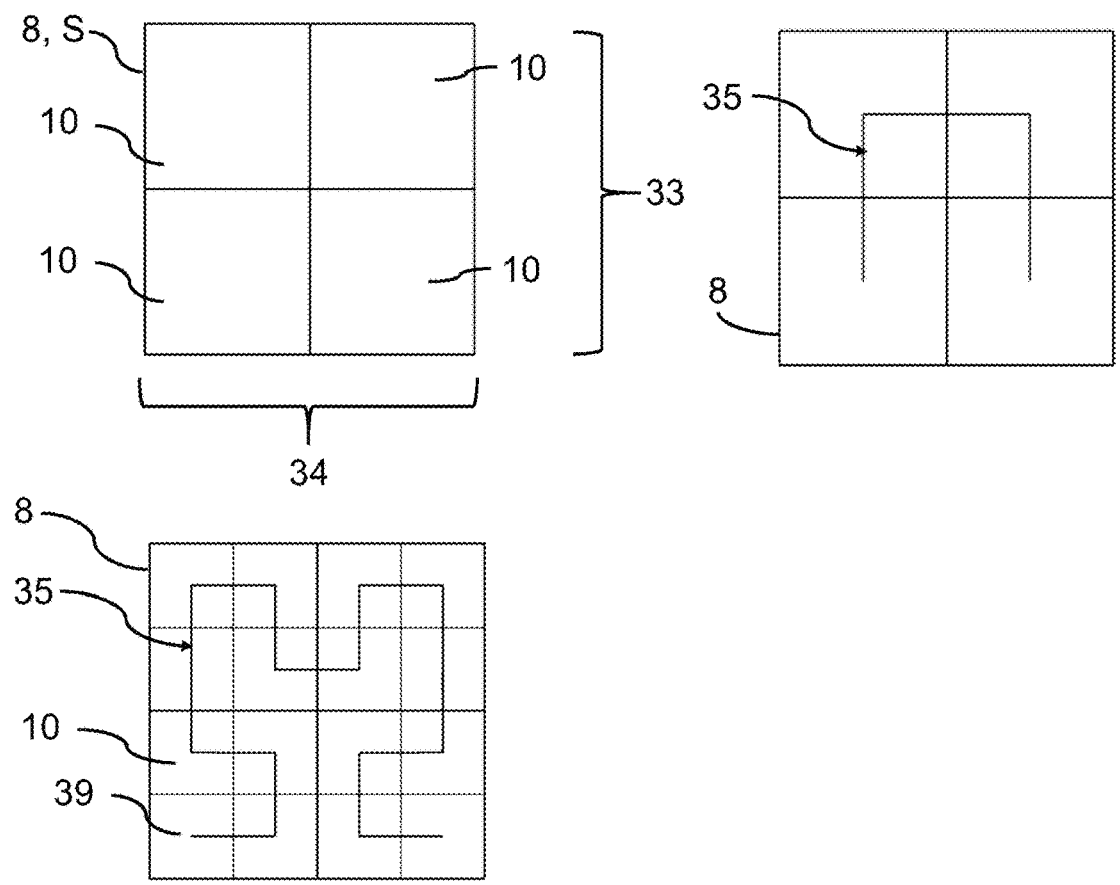
FIG. 6 illustrates the use of a space filling curve for completely filling up a pre-defined image space with a given number of pixels calculated from a computer file

FIG. 6 presents one solution to this problem, namely the use of so-called space-filling curves 35. Maintaining a uniform image size S can be achieved by filling a predefined image space 8 with relevant pixels (preferably without using zero padding), calculated from data of the CFUT 1 and thus representing important aspects of the CFUT 1 in the image 4. To do so, the image space 8 defined by a particular type of image, for example type A or B or C, is divided into different image segments 10, for example into quadrants as illustrated on the top left of FIG. 6. Next, the segments 10 are connected to each other by a space filling curve 35 such as a Hilbert curve of $1^{st}$ order, as shown in the top right in FIG. 6. This process can be iteratively repeated, in particular such that, one, several or all of the segments 10 are further divided in analogous manner into smaller sub-segments 39, as illustrated in the bottom left of FIG. 6. These sub-segments 39 can then be connected using a space filling curve 35 such as a Hilbert curve of $2^{nd}$ order, as shown in the bottom left of FIG. 6. This $2^{nd}$ order curve can be obtained by connecting the sub-segments 39 within a segment 10 by a Hilbert curve of order 1, respectively, and then by rotating these $1^{st}$ order curves and connecting them.

The general approach of using a space-filling curve 35 can thus imply to iteratively split up a given image space 8 into image segments 10, for example each time into a raster of 2×2 segments, and to fill up the resulting raster with pixels following the evolution of a space filling curve 35 connecting all of the segments. By varying the depth of splitting-up/of the iteration, a given image space 8 can be divided into varying numbers of segments (or sub-segments, or sub-sub-segments, which may all be considered as segments), such that different numbers of pixels calculated from a CFUT 1 of a specific size X (which may vary) can be used to fill up images 4 of a uniform image size S.

As an example of a possible implementation of using a space filling curve with CFUT 1 of varying sizes X, imagine an image of 8×8=64 pixels, and a set of data extracted from the CFUT that corresponds to 59 pixels. In this case, the set of data can be used to fill-up 59/64 pixels using the space-filling curve approach. The remaining 64−59=five pixels can then be filled up with data extracted from the start of the set of data. In this case, the last five pixels of the image will correspond to the first five pixels of the image, as they are calculated from identical data of the CFUT 1. Importantly, however, every pixel of the image thus represents meaningful information content of the CFUT 1.

Now imagine the case of a CFUT 1 of size X, from which a randomly extracted subset of data would allow the calculation of up to 69 pixels, although only 64 pixels are needed to produce a fully filled image of 8×8 pixels. One option would be to discard 5 pixels, but in this case, the information content of the CFUT 1 represented by those pixels would be lost. Instead, for example, the last data cluster or some of the last data clusters, from which the data are randomly extracted, can be chosen larger than the other data clusters of the CFUT 1, from which the subset of data is extracted. That is, by varying the size of the data clusters from which the data are extracted, a desired number of 64 pixels can be generated from the CFUT 1, just enough to fill up the 8×8 pixel image. In this approach again, every pixel represents meaningful information content of the CFUT 1, with the last pixels calculated from data randomly selected from data clusters, which are larger than the data clusters, from which the data are extracted, from which the first pixels of the image are calculated. These are just examples. The skilled person can conceive other variants of how to cope with small variations to a uniform image size. Masking, modifying the image support, inhomogeneous pixel sizes or stretching the data via interpolation to the final image size are other examples that might be employed, to maintain a uniform image size. In all of these cases, however, using a space-filling curve will preserve the overall locality of the data represented by the respective image.

Figure 7:
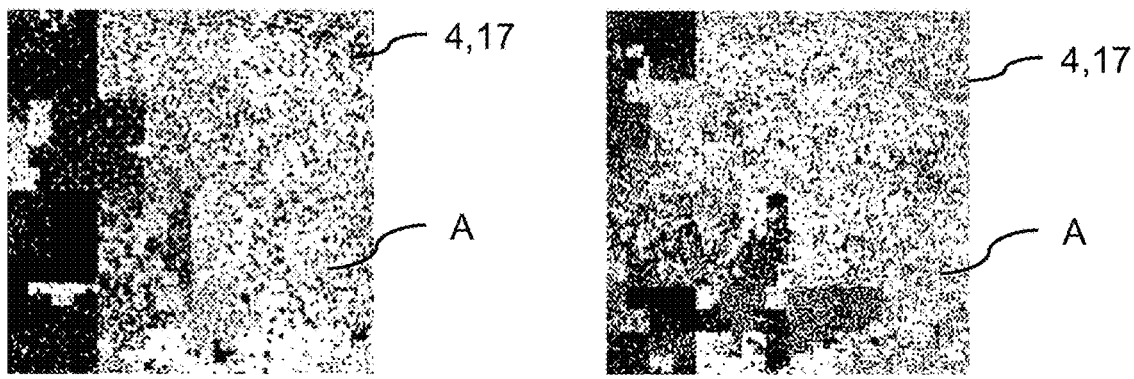
FIG. 7 shows images of uniform image size obtained by using the space filling curve approach illustrated in FIG. 6.

The result of the space-filling approach as explained above is shown in FIG. 7: Illustrated are two images 4 of type A obtained from two computer files of different sizes. These computer files can be converted into images 4 of varying sizes, as was illustrated in FIG. 5. However, by using the space filling curve approach illustrated in FIG. 6, images 4 can be obtained, as shown in FIG. 7, which are of a uniform image size S of N×M pixels, independent of the size X of the underlying computer file. The advantage is that the images 4 of FIG. 7 can thus be classified by the same classification module 6a (cf. FIG. 1), which is designed for the specific image size S.

The space filling curve approach explained with respect to FIG. 6 can be used for obtaining images 4 of any type, in particular of type A, B or C. As this approach does not use zero padding, all pixels of the respective image 4 will be calculated from data of the CFUT 1 and thus represent information that is meaningful for the classification.

For example, when applying a Hilbert-curve 35 to a 2-D image space 8 of 256×256 pixels, a maximum order of 8 can be used for the Hilbert curve. As individual pixels cannot be divided further, such an image 4 can thus represent a maximum of 256 2=65536 bits (in case of black-and-white image) or 65536 bytes (in case of a grey-scale image) of data of a CFUT.

To increase the amount of data represented by a particular image 4, multidimensional pixels may be used. For example, in the case of the RGB-color images 4, 18 of type A shown in FIG. 8, three consecutive (i.e. neighboring) bytes (byte-triple) contained in the CFUT 1 are represented by one RGB-pixel 36, with each byte of the tuple defining the respective red, green or blue color value (between 0 and 255). This way, information contained in the CFUT 1 can be visualized by color values. For an image size of 256×256 pixels, this means that a total of 65536×3 bytes=192 kB can be represented by the RGB-image without loss of information. As similar byte-tuples will produce similar colors in the image 4, correlations between similar data that are located far from each other within the CFUT 1 can be identified.

In case the size of the file to be converted is less than 192 kB, a space filling curve 35 of lower order may be used, that is, the image space 8 will be divided more coarsely into image segments 10.

In case, the CFUT 1 exceeds 192 kB, the uniform image size S of type A images 4 is maintained (aside from using a space filling curve 35) by converting only part of the data contained in the CFUT 1 and neglecting the remainder of the CFUT 1. Images 4 of type A are then calculated only from respective subsets of data, which are randomly extracted from the CFUT 1. To maintain an even sampling of the CFUT 1, the CFUT 1 may be divided into data clusters, and from each cluster, data may be randomly selected to form the subset. The resulting images 4 can be color images 4, 18 of 3-dimensional RGB(red/green/blue)-pixels 36, as illustrated in FIG. 8.

As the file size X of the CFUT 1 can vary greatly, the random selection of data in the case of image type A, which is comparable to a random sampling of the CFUT 1, will be more or less coarse for a given image size S. Therefore, a series 9 of images 4 of type A is calculated, as illustrated in FIG. 1 by series 9a at the top. Each of the images 4 of the series 9a is different in that it represents a different subset of data of the CFUT 1. The larger the CFUT 1, the more images 4 of type A can be calculated (and classified afterwards using the image classification module 6a), thereby increasing the amount of data of the CFUT 1 that has been (randomly) sampled and converted into an image 4.

The approach of using data clusters and randomly selecting subsets of data from which to calculate an image 4, can also be applied to entropy images 4 of type B or to images of type C.

In the case of image type C (cf. FIGS. 11 and 12), maintaining a uniform image size $S_i$ can be achieved by a loss-less byte conversion that considers all data contained in the CFUT 1. In other words, a large number of pixels are first calculated considering all data contained in the CFUT 1; afterwards, some of the computed pixels may be discarded, i.e. only a subset of the calculated pixels may be present in the final image. Alternatively, the CFUT 1 can also be downsized prior to image conversion, and this downsizing can likewise consider all data contained in the CFUT 1.

For example consider an image space 8 of 128×128 RGB pixels. Such an image can visualize a total of 16384×3 bytes=49 kB. Hence, if the file to be converted, which may be a portion of the CFUT 1 for example, is larger than 49 kB, it may be first transformed into a continuous byte-string, and then every 2nd byte of the string may be deleted, thereby creating a reduced set of data. If this reduction is not sufficient, the reduction of the string may be repeated, e.g. by deleting every 3rd byte of the already reduced string, i.e. in this case, data strings of three consecutive bytes are thus downsized to a data block of two bytes. This way, a reproducible sampling of the CFUT 1 is performed, and the bytes remaining after downsizing are finally used for defining the RGB pixels.

Figure 11:
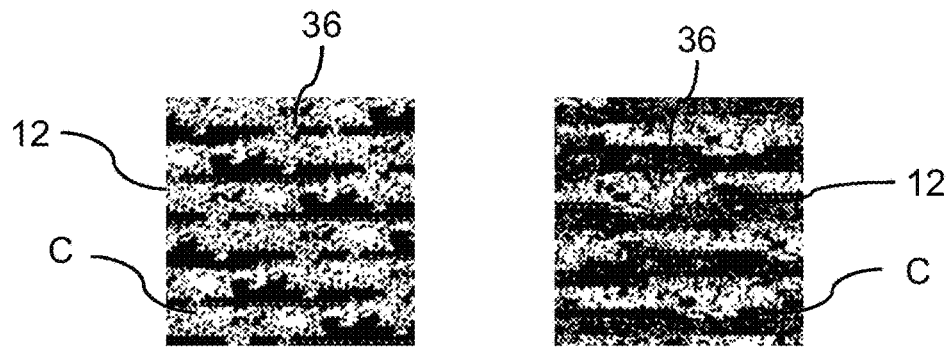
FIG. 11 shows two examples of images a third image type C, namely two images calculated from skeletons of a benign (left) and malign (right) computer file under test.
Figure 12:
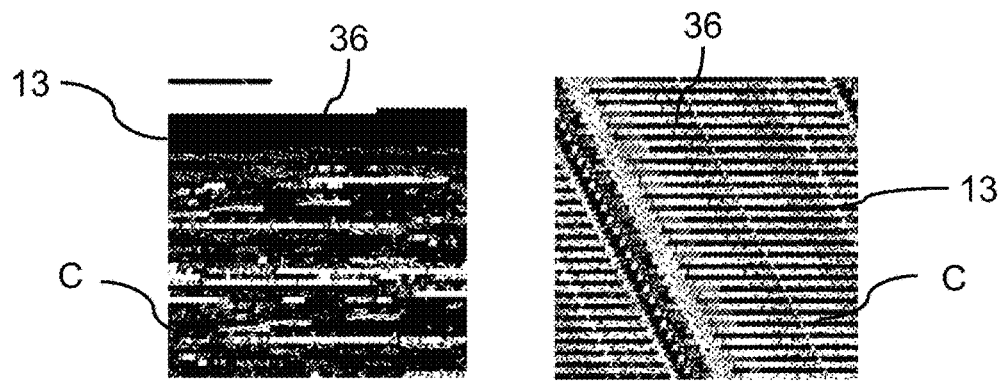
FIG. 12 shows two examples of images the same image type C but of different image size as the images of FIG. 11, the two images being calculated from bacons of a benign (left) and malign (right) computer file under test.

As a result, all pixels of an image 4 may thus be calculated from a respective sequence of neighboring data blocks 38 of the CFUT 1 (in particular from bytes in close vicinity to each other within the CFUT 1), which is the case in the images 4 of type C shown in FIGS. 11 and 12. The reduced byte string used for calculating these images 4 is not visualized directly (e.g. line-by-line), however. Rather, the pixels 36 calculated from the reduced byte string are re-allocated.

Figure 10:
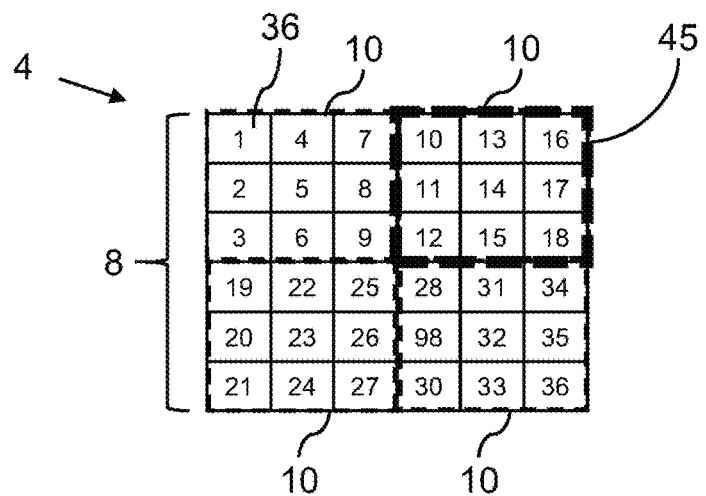
FIG. 10 illustrates a possible re-allocation of pixels in an image calculated from a computer file under test.

For illustration, FIG. 10 shows a simplified example of a possible re-allocation of pixels calculated from a one-dimensional string of bytes obtained from a CFUT 1. The 1D-stream of pixels 36 is not simply filled line-by-line into the image space 8. Rather, pixels 36 are re-allocated in blocks filling respective image segments 10 of the image 4. Such a re-allocation is characterized in that neighboring pixels (e.g. the pixels #10-18) within a particular image segment 10 of the image 4 are calculated from data blocks 38 of the CFUT 1, which are contained within a specific local data segment 43 (cf. FIG. 3) of the CFUT 1. As the particular image segment 10 and the corresponding data segment 43 are thus spatially correlated, the locality of information is preserved, i.e. pixels 36 in close vicinity to each other represent binary data that are spatially close to each other within the CFUT 1. In conclusion, the original CFUT 1 has been divided into different data segments 43, which have then been individually mapped onto different image segments 10 of the final image 4.

Visible in FIG. 10 is also a convolution window 45 that is used by the convolutional neural network 24 processing the image 4 displayed in FIG. 10. As visible, it is suggested that the image segments 10 match the size C of the convolution window 45, since, in this case, latent space representations derived from a convolution of an image segment 10 will be correlated to the underlying data contained in the corresponding data segment 43 of the CFUT 1.

The skeleton images 12 shown in FIG. 11 have been calculated by first extracting a skeleton content of the CFUT (1) as a skeleton-file and then converting the skeleton-file into an image 4 of type C1 (cf. FIG. 1). This is done by first transforming the skeleton-file into a byte string, reducing the byte string as explained above, with 3 consecutive bytes of the reduced string defining one RGB-pixel, and then and re-allocating the pixels as explained before.

Figure 9:
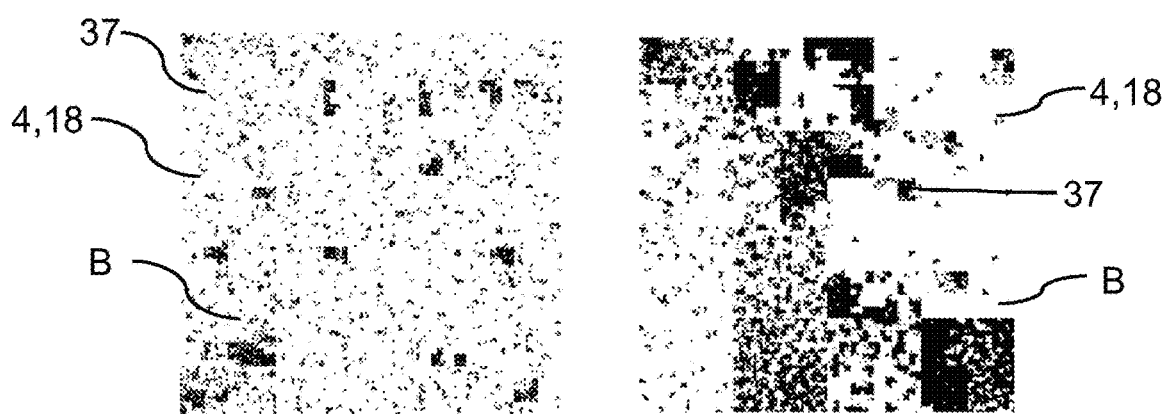
FIG. 9 shows two examples of images a second image type B that visualized local entropies, as obtained from benign (left) and malign (right) PDF documents

Images of type B are images 4 which visualize Shannon-entropies of local data blocks contained in the CFUT 1. This is done by calculating a ratio of a local Shannon-entropy of a data block and a total Shannon-entropy of the CFUT 1 as a merit number, and by plotting these local relative entropies after normalization. The resulting images 4 can be color images 18 of one dimensional pixels 37, as illustrated in FIG. 9.

Figure 13:
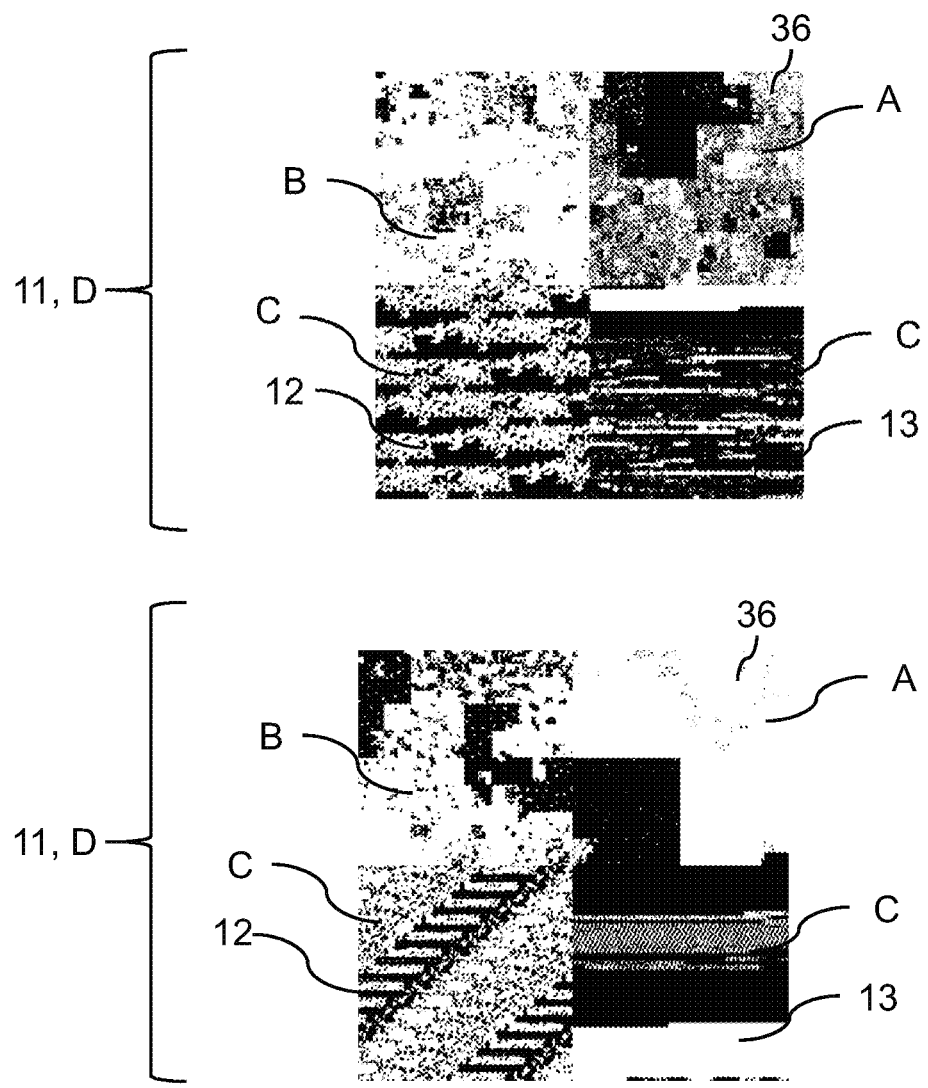
FIG. 13 illustrates two compound images obtained by combining several other images derived from a benign (top) or malign (bottom) computer file.
Figure 14:
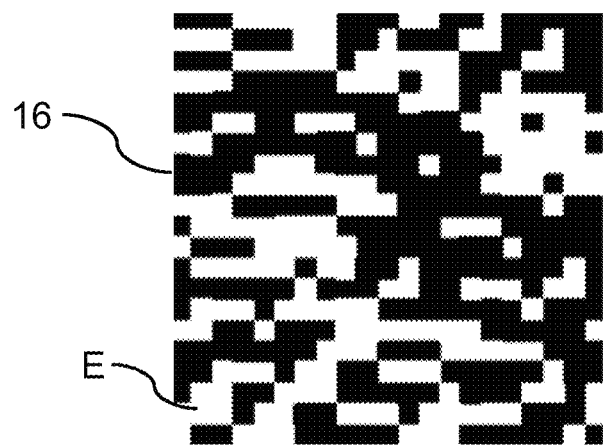
FIG. 14 illustrates two matrix images obtained from conversion of data features contained in a benign (top) and malign (bottom) computer file under test.
Figure 14:
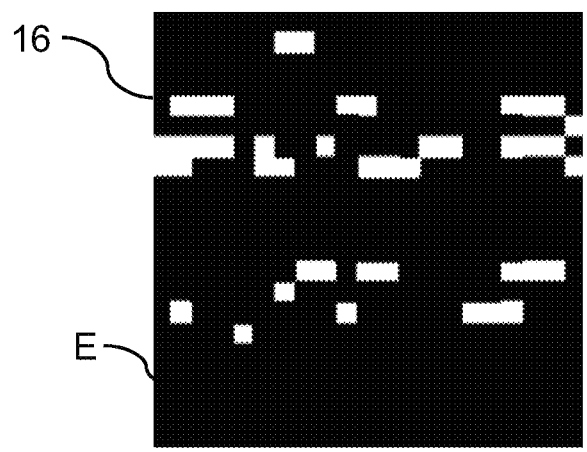

A particular efficient solution is the use of compound images 11 as shown in FIG. 13. Such images may be obtained by combining type A, B and C images 4. For such compound images 11 some image cropping may be tolerable, in particular when using sub-images of different image sizes. Type A images 4 can be images of a uniform image size, by mapping a random selection of data contained in the CFUT 1 to an image space 8 of the image 4. Type B images 4 are entropy images 4, which may be obtained by calculating entropies of data-blocks of the CFUT 1 and visualizing the entropies as ratios of the total entropy of the CFUT 1. Type C images 4 may be obtained by applying a byte-conversion to the CFUT 1, as explained above.

In summary, a method is proposed that can handle computer files 1 of varying types and sizes and at the same time maintain a high detection performance by classifying a number of different types (A, B, C, D, E) of images 4, each calculated or derived from a particular computer file under test 1 (CFUT), using artificial intelligence methods such as machine learning, in particular deep learning, for example as provided by neuronal networks 24 or supervised deep learning algorithms. The different image types are generated using different image conversion techniques and a number of approaches are presented for computing images 4 of uniform size $S_i$ that contain relevant information for classifying the CFUT 1.

LIST OF REFERENCE NUMERALS

1 computer file under test (CFUT)
2 malware
3 image data
4 image
5 multitude (of 4)
6 image classification module
7 classifier module
8 image space (defined by 4)
9 series of images
10 image segment (of 4)
11 compound image
12 skeleton-image
13 bacon-image
14 data features (of 1)
15 data classification module
16 matrix image
17 grey-scale image (1D-pixels have values from 0 . . . 255)
18 color image (pixels may have 1-3 dimensions: e.g. R or R/G/B)
19 latent space concatenation and classification
20 conversion engine (calculates 4 from 1)
21 extraction of data features
22 artificial intelligence stack
23 final classification score
24 neural network
25 latent space classification module
26 decision tree (DT)
27 encoding matrix
28 structure (of 1)
29 input layer
30 hidden layer
31 output layer
32 classification engine
33 skeleton
34 bacon
35 space filling curve
36 multidimensional pixel
37 one-dimensional pixel
38 data block
39 sub-segment
40 skeleton portion (of 4)
41 bacon portion (of 4)
42 pre-classification score
43 data segment
44 latent space representation (of 4)
45 convolution window

The invention claimed is:

1. A method for detection of malware (2), by static malware analysis, the method comprising processing a computer file under test (1) (CFUT) by the following steps:

converting the CFUT (1) into image data (3) that comprise a multitude (5) of different images (4) without executing the CFUT (1); and classifying the image data (3) using artificial intelligence to detect malware, wherein the multitude of (5) different images (4) comprise several different image types (A, B, C, D, E), with each said image type (A, B, C, D, E) characterized by a particular image size $S_i$, and at least some of the different images (4) differ in at least one of a respective image size $S_i$, a respective underlying conversion algorithm used for calculating particular ones of the image type (A, B, C, D, E), or a respective pixel type used for the particular image type (A, B, C, D, E), such that each of the different image types (A, B, C, D, E) employed provides a different semantic and visual representation of the CFUT (1), and these different visual representations of the CFUT (1) differ in a semantic representation of information on inner data components of the CFUT, wherein the semantic representations provided by the different image types (A, B, C, D, E) differ in terms of information on at least one of:
a structure,
a composition,
a spatial distribution,
a density, or
statistics
of inner data components of the CFUT (1), respectively, and wherein the classifying further comprises:
classifying, in a first step, each of the multitude (5) of different images (4) using the artificial intelligence independently from the other images, resulting in a multitude of independent pre-classification scores (42a-42g) for each of the multitude (5) of different images (4), and
evaluating, in a second step, a malignity of the CFUT based on an overall classification result of the multitude (5) of different images (4) in the form of a final classification score (23), which is determined based on the independent pre-classification scores (42a-42g) of the different images (4).

2. The method according to claim 1, further comprising classifying at least two of the different images (4) each by a separate image classification module (6),
evaluating outputs of image classification modules (6) by a classifier module (7) to detect the malware,
wherein at least one of the image classification modules (6) or the classifier module (7) is trained using training images prior to the classification of the image data (3).

3. The method according to claim 1, further comprising, converting the CFUT (1) such that for at least one of the images (4), a respective uniform image size $S_i$ is maintained independent of a size X of the CFUT (1), by using a loss-less conversion that considers all data of the CFUT (1) or
by converting only part of the data contained in the CFUT (1) and neglecting a remainder of the CFUT (1).

4. The method according to claim 1, wherein the image data (3) are classified purely by static analysis without dynamic interaction with the CFUT (1) or without activating the malware (2).

5. The method according to claim 1, wherein at least one of the different images (4) is an image (4) calculated from a subset of data of the CFUT (1), such that the image size $S_i$ is maintained independent of a size X of the CFUT (1), and at least one of a) the subset is at least one of selected randomly from the CFUT (1) or independently of the size X of the CFUT (1), or b) the subset is selected by employing a random number generator.

6. The method according to claim 5, wherein at least one of:
a) the subset is selected by dividing the CFUT (1) into data clusters and by randomly selecting data from within each of the data clusters to form the subset,
b) multiple data points from within one particular of said data clusters are used to calculate a particular pixel of said image (4) of uniform image size $S_i$, or
c) an image space (8) defined by said image (4) is filled up with said pixels by arranging the pixels in the image space (8) using a space filling curve.

7. The method according to claim 6, further comprising repeatedly converting the same CFUT (1) into the image (4) of uniform image size Si, each time calculating a respective said image (4a, 4b, 4c, 4d) from a randomly selected subset of data of the CFUT (1), to form a series (9) of the images (4a, 4b, 4c, 4d) all calculated from varying data subsets of the CFUT (1), and
detecting the malware by classifying, either sequentially or in parallel, said series (9) of images (4a, 4b, 4c, 4d),
wherein the conversion is repeated until all data contained in the CFUT (1) have been used at least once for calculating said series (9) of images (4).

8. The method according to claim 1, wherein at least one of
a) the CFUT (1) is converted into one of the different images (4) by mapping, or
b) all pixels of at least one of the different images (4) are calculated from data of the CFUT (1).

9. The method according to claim 1, wherein
all pixels of at least one of the different images (4) are calculated from a respective sequence of data blocks (38) of the CFUT (1), and
a uniform image size $S_i$ is maintained by deleting pixels iteratively and thus using only a subset of the calculated pixels in a final image (4).

10. The method according to claim 1, further comprising at least one of
a) filling up an image space (8) defined by at least one of the images (4) completely with pixels (36 or 37) calculated from data of the CFUT (1) using a space filling curve (35), or
b) the converting includes the CFUT (1) being converted into one of the different images (4) by mapping a sequence of data blocks (38) of the CFUT (1) using a space filling curve (35).

11. The method according to claim 1, further comprising generating at least one of the different images (4) from the CFUT (1) by calculating entropies of data blocks (38) of the CFUT (1),
wherein pixel values of this particular image are given by ratios of the calculated entropies divided by a total entropy of the CFUT, and normalizing said pixel values to an interval ranging from 0 to 1.

12. The method according to claim 1, further comprising, obtaining one of the different images (4) by
segmenting an image space (8) of that particular image (4) into a multitude of image segments (10), segmenting the CFUT (1) into data segments (43) of successive data blocks (38), and by mapping different ones of the data segments (43) onto different ones of the image segments (10).

13. The method according to claim 12, wherein pixels (36, 37) of at least one of the different images (4), which are calculated from the successive data blocks (38) of the CFUT (1), are re-allocated in blocks filling respective ones of the image segments (10) of the image (4),
such that neighboring ones of the pixels (36,37) within a particular image segment (10) are calculated from data blocks (38) which are contained within a specific local data segment (43) of the CFUT (1).

14. The method according to claim 1, wherein at least one of the different images (4) is classified by an image classification module (6) that employs a convolution window (45) of size C for processing said image (4) and said image (4) is divided into image segments (10) which match the size C of the convolution window (45).

15. The method according to claim 1, wherein the CFUT (1) is split up into sub-files, and each of the sub-files is converted into a different one of the images (4), and one of the different images (4) is segmented into a multitude of sub-images, and data contained in one of the sub-files are mapped to a respective one of the sub-images.

16. The method according to claim 1, wherein the CFUT (1) is first divided into a skeleton-file containing structural information about the CFUT (1) and a bacon-file containing user-specific information characterizing the CFUT (1), and at least one of the skeleton-file or the bacon-file are each converted into one of the different images (4).

17. The method according to claim 1, wherein prior to or during the conversion of the CFUT (1) into one of the different images (4) at least a portion of the CFUT (1) is downsized to a reduced set of such that all data contained in the portion of the CFUT (1) contribute to the reduced set of data.

18. The method according to claim 1, wherein at least one of: pixels of at least one of the different images (4) are given by n-dimensional vectors, or pixels of at least one of the different images (4) have values that result from values of several bits or bytes of the CFUT.

19. The method according to claim 1, wherein at least two of the different images (4) are combined to a compound image (11) such that the image data (3) comprises the compound image (11).

20. The method according to claim 1, wherein one of the different images (4) is a compound image (11) resulting from combining
an image (4) of a first one of the image types (A) calculated from a randomly chosen subset of data of the CFUT, and
an image of a second image type (B) visualizing local entropies of the CFUT.

21. The method according to claim 1, wherein a number of characteristic data features (14) are extracted from the CFUT (1) directly, and fed into a separate data classification module (15), whose output is used to detect the malware (2).

22. The method according to claim 1, wherein a number of N different data features (14) are extracted as N numerical values from the CFUT, and converted into a matrix image (16), and
the malware (2) is detected based in part on a classification result of said matrix image (16).

23. The method according to claim 1, wherein at least one of
a) at least two different latent space representations (44) are classified to produce a pre-classification score (42f) that is evaluated to detect the malware (2), or
b) a latent space classification module (25) classifies at least two different latent space representations (44) of at least one of the different images (4) to detect the malware (2).

24. The method according to claim 1, wherein at least one of:
a) the image data (3) are classified using at least one neural network (NN),
at least one decision tree (DT),
or
the artificial intelligence used for classifying the image data (3) is configured for operating on at least one of arrays of continuous data or on data arranged in multidimensional image file formats.

25. A computer system comprising a hardware processor configured to carry out the following steps for processing a computer file under test (1) (CFUT) for detection of malware (2) by static malware analysis:

converting the CFUT (1) into image data (3) that comprise a multitude (5) of different images (4) without executing the CFUT (1); and
classifying the image data (3) using artificial intelligence to detect malware,
wherein the multitude of (5) different images (4) comprise several different image types (A, B, C, D, E), with each said image type (A, B, C, D, E) characterized by a particular image size $S_i$, and
at least some of the different images (4) differ in at least one of
a respective image size $S_i$,
a respective underlying conversion algorithm used for calculating the particular ones of the image type (A, B, C, D, E), or
a respective pixel type used for the particular image type (A, B, C, D, E), such that each of the different image types (A, B, C, D, E) employed provides a different semantic and visual representation of the CFUT (1), and these different visual representations of the CFUT (1) differ in a semantic representation of information on inner data components of the CFUT, wherein the semantic representations provided by the different image types (A, B, C, D, E) differ in terms of information on at least one of:
a structure,
a composition,
a spatial distribution,
a density, or
statistics
of inner data components of the CFUT (1), respectively, and
wherein the classifying further comprises:
classifying, in a first step, each of the multitude (5) of different images (4) using the artificial intelligence independently from the other images, resulting in a multitude of independent pre-classification scores (42a-42g) for each of the multitude (5) of different images (4), and
evaluating, in a second step, a malignity of the CFUT based on an overall classification result of the multitude (5) of different images (4) in the form of a final classification score (23), which is determined based on the independent pre-classification scores (42a-42g) of the different images (4).

26. A non-transitory computer-readable storage medium comprising instructions which, when executed by a computer cause the computer to process a computer file under test (1) (CFUT) for detection of malware (2) by static malware analysis, including the steps of:
converting the CFUT (1) into image data (3) that comprise a multitude (5) of different images (4)without executing the CFUT (1); and
classifying the image data (3) using artificial intelligence to detect malware,
wherein the multitude of (5) different images (4) comprise several different image types (A, B, C, D, E), with each said image type (A, B, C, D, E) characterized by a particular image size $S_i$, and
at least some of the different images (4) differ in at least one of
a respective image size $S_i$,
a respective underlying conversion algorithm used for calculating particular ones of the image types (A, B, C, D, E), or
a respective pixel type used for the particular image type (A, B, C, D, E), such that each of the different image types (A, B, C, D, E) employed provides a different semantic and visual representation of the CFUT (1), and these different visual representations of the CFUT (1) differ in the semantic representation of information on inner data components of the CFUT, wherein the semantic representations provided by the different image types (A, B, C, D, E) differ in terms of information on at least one of:

a structure,
a composition,
a spatial distribution,
a density, or
statistics of inner data components of the CFUT (1), respectively, and wherein the classifying further comprises:

classifying, in a first step, each of the multitude (5) of different images (4) using the artificial intelligence independently from the other images, resulting in a multitude of independent pre-classification scores (42a-42g) for each of the multitude (5) of different images (4), and evaluating, in a second step, a malignity of the CFUT based on an overall classification result of the multitude (5) of different images (4) in the form of a final classification score (23), which is determined based on the independent pre-classification scores (42a-42g) of the different images (4).

27. The method according to claim 1, wherein
a) each of said different images (4) is calculated from data contained in the computer file under test (1), and
b) the multitude (5) of different images (4) comprise different image representations of parts of the computer file under test (1) in a form of varying of the image types (A, B, C, D, E),
c) with each said image type (A, B, C, D, E) providing a specific part of information which is contained in the computer file under test (1) and which is relevant for the detection of malware.

* * * * *